United States Patent
Che et al.

(10) Patent No.: US 9,584,216 B2
(45) Date of Patent: Feb. 28, 2017

(54) DYNAMIC ALLOCATION OF SUBFRAME SCHEDULING FOR TIME DIVISON DUPLEX OPERATION IN A PACKET-BASED WIRELESS COMMUNICATION SYSTEM

(75) Inventors: Xiang Guang Che, Beijing (CN); Troels Emil Kolding, Klarup (DK)

(73) Assignee: Nokia Technologies Oy, Espoo (FI)

(*) Notice: Subject to any disclaimer, the term of this patent is extended or adjusted under 35 U.S.C. 154(b) by 287 days.

(21) Appl. No.: 13/127,130

(22) PCT Filed: Oct. 28, 2009

(86) PCT No.: PCT/FI2009/050863
§ 371 (c)(1),
(2), (4) Date: May 2, 2011

(87) PCT Pub. No.: WO2010/049587
PCT Pub. Date: May 6, 2010

(65) Prior Publication Data
US 2011/0211503 A1 Sep. 1, 2011

Related U.S. Application Data

(60) Provisional application No. 61/110,422, filed on Oct. 31, 2008.

(51) Int. Cl.
*H04W 72/04* (2009.01)
*H04B 7/26* (2006.01)
(Continued)

(52) U.S. Cl.
CPC ......... *H04B 7/2656* (2013.01); *H04B 7/2643* (2013.01); *H04L 1/1887* (2013.01);
(Continued)

(58) Field of Classification Search
CPC ..... H04W 16/10; H04W 16/12; H04J 3/1605; H04J 3/1694
(Continued)

(56) References Cited

U.S. PATENT DOCUMENTS

| | | | |
|---|---|---|---|
| 5,420,851 | A | 5/1995 | Seshadri et al. |
| 5,594,720 | A | 1/1997 | Papadopoulos et al. |

(Continued)

FOREIGN PATENT DOCUMENTS

| | | |
|---|---|---|
| CN | 1282493 A | 1/2001 |
| WO | 2008/097019 A1 | 8/2008 |
| WO | WO-2008097019 A1 | 8/2008 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network(E-UTRAN); Overall description; Stage 2 (Release 8)", 3GPP TS 36.300, v8.5.0, May 2008, pp. 1-134.

(Continued)

*Primary Examiner* — Andrew Chriss
*Assistant Examiner* — Romani Ohri
(74) *Attorney, Agent, or Firm* — Mintz Levin Cohn Ferris Glovsky and Popeo, P.C.

(57) ABSTRACT

Systems and methods for enabling the dynamic allocation of certain sub frames as downlink or uplink resources in a time division duplexed over the air communications system. A base station or eNB may allocate certain subframes within a repeating radio frame of a TDD configuration as either DL or UL subframes for communicating to user equipment or UE devices to increase efficient use of system resources based on the data to be transmitted. Methods for determining the capabilities of a selected UE and based on the determining step, dynamically allocating certain subframes are dis- (Continued)

closed. The methods and systems are compatible with user equipment that does not support the dynamic allocation of subframes.

27 Claims, 9 Drawing Sheets

(51) Int. Cl.
  *H04L 5/00* (2006.01)
  *H04L 1/18* (2006.01)
  *H04W 72/12* (2009.01)
(52) U.S. Cl.
  CPC ............ *H04L 5/0005* (2013.01); *H04L 5/006* (2013.01); *H04L 5/0092* (2013.01); *H04L 5/0096* (2013.01); *H04W 72/0446* (2013.01); *H04W 72/12* (2013.01)
(58) Field of Classification Search
  USPC .............................. 370/280, 395.4, 329, 294
  See application file for complete search history.

(56) References Cited

U.S. PATENT DOCUMENTS

| 6,016,311 | A | 1/2000 | Gilbert et al. |
| 7,440,422 | B1* | 10/2008 | Holma et al. ................. 370/278 |
| 2005/0201319 | A1* | 9/2005 | Lee ....................... H04L 1/0073 370/321 |
| 2008/0192660 | A1* | 8/2008 | Li et al. ........................ 370/294 |
| 2009/0073929 | A1* | 3/2009 | Malladi et al. ............... 370/329 |
| 2009/0109892 | A1* | 4/2009 | Oyman et al. ................ 370/315 |
| 2009/0181690 | A1 | 7/2009 | McCoy et al. |
| 2009/0201863 | A1* | 8/2009 | Pi .................................. 370/329 |
| 2009/0231989 | A1* | 9/2009 | Larsson ............... H04B 17/345 370/201 |
| 2011/0096783 | A1* | 4/2011 | Cai et al. ................... 370/395.4 |

OTHER PUBLICATIONS

International Search Report and Written Opinion received for corresponding Patent Cooperation Treaty Application No. PCT/FI2009/050863, dated Jan. 29, 2010, 16 pages.

* cited by examiner

| Configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIGURE 5

DYNAMIC ALLOCATION OF SUBFRAME SCHEDULING FOR TIME DIVISON DUPLEX OPERATION IN A PACKET-BASED WIRELESS COMMUNICATION SYSTEM

RELATED APPLICATION

This application was originally filed as PCT Application No. PCT/FI2009/050863 filed Oct. 28, 2009, which claims priority benefit from United States Provisional Patent Application No. 61/110,422, filed Oct. 31, 2008.

TECHNICAL FIELD

The present invention is directed, in general, to communication systems and, more particularly, to a system and method for providing the use of user equipment or mobile transceiver devices in a packet based communication system that includes time division duplex (TDD) communication devices with dynamic traffic allocation while allowing for efficient use, simple implementation and conservation of system resources.

BACKGROUND

As wireless communication systems such as cellular telephone, satellite, and microwave communication systems become widely deployed and continue to attract a growing number of users, there is a pressing need to accommodate a large and variable number of communication subsystems transmitting a growing volume of data with a fixed resource such as a fixed channel bandwidth accommodating a fixed data packet size. Traditional communication system designs employing a fixed resource (e.g., a fixed data rate for each user) have become challenged to provide high, but flexible, data transmission rates in view of the rapidly growing customer base.

The third generation partnership project long term evolution ("3GPP LTE") is the name generally used to describe an ongoing effort across the industry to improve the universal mobile telecommunications system ("UMTS") for mobile communications. The improvements are being made to cope with continuing new requirements and the growing base of users. Goals of this broadly based project include improving communication efficiency, lowering costs, improving services, making use of new spectrum opportunities, and achieving better integration with other open standards and backwards compatibility with some existing infrastructure that is compliant with earlier standards. The project envisions a packet switched communications environment with support for such services as VoIP ("Voice over Internet Protocol"). The 3GPP LTE project is not itself a standard-generating effort, but will result in new recommendations for standards for the UMTS.

The UTRAN includes multiple Radio Network Subsystems (RNSs), each of which contains at least one Radio Network Controller (RNC). However, it should be noted that the RNC may not be present in the actual implemented systems incorporating Long Term Evolution (LTE) of UTRAN (E-UTRAN). LTE may include a centralized or decentralized entity for control information. In UTRAN operation, each RNC may be connected to multiple Node Bs which are the UMTS counterparts to Global System for Mobile Communications (GSM) base stations. In E-UTRAN systems, the e-Node B may be, or is, connected directly to the access gateway ("aGW," sometimes referred to as the services gateway "sGW"). Each Node B may be in radio contact with multiple UEs (generally, user equipment including mobile transceivers or cellphones, although other devices such as fixed cellular phones, mobile web browsers, laptops, PDAs, MP3 players, gaming devices with transceivers may also be UEs) via the radio Uu interface.

The wireless communication systems as described herein are applicable to, for instance, 3GPP LTE compatible wireless communication systems and of interest is an aspect of LTE referred to as "evolved UMTS Terrestrial Radio Access Network," or E-UTRAN. In general, E-UTRAN resources are assigned more or less temporarily by the network to one or more UEs by use of allocation tables, or more generally by use of a downlink resource assignment channel or physical downlink control channel (PDCCH). LTE is a packet-based system and therefore, there may not be a dedicated connection reserved for communication between a UE and the network. Users are generally scheduled on a shared channel every transmission time interval (TTI) by a Node B or an evolved Node B (e-Node B). A Node B or an e-Node B controls the communications between user equipment terminals in a cell served by the Node B or e-Node B. In general, one Node B or e-Node B serves each cell. A Node B may be sometimes referred to as a "base station." Resources needed for data transfer are assigned either as one time assignments or in a persistent/semi-static way. The LTE, also referred to as 3.9G, generally supports a large number of users per cell with quasi-instantaneous access to radio resources in the active state. It is a design requirement that at least 200 users per cell should be supported in the active state for spectrum allocations up to 5 megahertz (MHz), and at least 400 users for a higher spectrum allocation.

In order to facilitate scheduling on the shared channel, the e-Node B transmits a resource allocation to a particular UE in a downlink-shared control channel (PDCCH) to the UE. The allocation information may be related to both uplink and downlink channels. The allocation information may include information about which resource blocks in the frequency domain or time domain, or both, are allocated to the scheduled user(s), the modulation and coding schemes to use, what the size of the transport block is, and the like.

The lowest level of communication in the e-UTRAN system, Level 1, is implemented by the Physical Layer ("PHY") in the UE and in the e-Node B and the PHY performs the physical transport of the packets between them over the air interface using radio frequency signals. In order to ensure a transmitted packet was received, an automatic retransmit request ("ARQ") and a hybrid automatic retransmit request ("HARQ") approach are provided. Thus, whenever the UE receives packets through one of several downlink channels, including common channels and shared channels, the UE performs a communications error check on the received packets, typically a Cyclic Redundancy Check (CRC), and in a later subframe following the reception of the packets, transmits a response on the uplink to the e-Node B or base station. The response is either an Acknowledgement (ACK) or a Negative Acknowledgement (NACK) message. If the response is a NACK, the e-Node B automatically retransmits the packets in a later subframe on the downlink or DL. In the same manner, any UL transmission from the UE to the e-Node B is responded to, later in time, by a NACK/ACK message on the DL channel to complete the HARQ. In this manner, the packet communications system remains robust with a low latency time and fast turnaround time.

As presently proposed, uplink HARQ messages are synchronous. The synchronous HARQ follows a downlink transmission from an eNB to a UE by a predetermined number of subframes. The use of the synchronous HARQ therefore places timing requirements on the following subframes, as an uplink HARQ message must be able to be transmitted within certain time constraints.

E-UTRAN networks may provide support for various traffic types. UEs may include, as non-limiting examples, web based wireless appliances such as web browsing devices. Internet based video delivery may be provided, for mobile television or audio or video program delivery. Some of these applications are very asymmetric in terms of data volume in UL and DL direction; often downlink traffic to the UE will be far more frequent than uplink traffic from the UE. As the user interfaces with the UE device, the traffic allocation may change. For example, the user may send email, make voice calls, or access other services and then later return to web browsing. Ideally, the UE and the eNB could dynamically allocate the subframes to provide more data capacity in one direction, or the other.

The e-UTRAN project requires backwards compatibility support as well. To provide this support, any changes to the interface timing must also be compatible with devices that do not implement the improvements. For example, currently, so called "Release 8" devices are being contemplated. If these devices are produced, any changes to the e-UTRAN timing specifications must be implemented in such a manner so that these earlier devices will still operate correctly in the system, even though later devices may have additional features.

A continuing need thus exists for a system, methods and circuitry to implement support for certain dynamic changes to the subframe allocations between an eNB and a UE to provide better support for asymmetric data traffic, when appropriate.

SUMMARY OF THE INVENTION

These and other problems are generally solved or circumvented, and technical advantages are generally achieved, by advantageous embodiments of the present invention which include an apparatus and methods according to an embodiment for providing a UE supporting the dynamic allocation of subframes within a TDD communication systems to provide efficient use of downlink (DL) and uplink (UL) resources.

According to an illustrative embodiment, an apparatus is provided that may communicate TDD radio frames to and from a base station such as an eNB using dynamic allocation of UL and DL traffic in certain subframes within a TDD configuration frame. Subframes within the frame carrying certain channel information are designated as protected subframes and may not be changed from the original TDD configuration, while subframes within the radio frame that are not carrying certain channel information are designated as flexible subframes. An apparatus may allocate either DL or UL traffic in the flexible subframes, according to certain rules. In this manner the amount of data capacity for UL or DL traffic may be re-partitioned dynamically according to the data traffic being transmitted.

According to another illustrative embodiment, dynamic DL subframe allocations may be made within a flexible subframe that is part of a TDD radio frame used in over the air communications between an eNB and a UE device. In this embodiment, the UE will detect, or be otherwise informed, that the present subframe is a downlink subframe. ACK/NACK messages acknowledging receipt of the data transmitted in the DL subframe will be transmitted in a corresponding UL subframe as required. Certain subframes in the TDD frame will be considered fixed subframes and the UL or DL allocation for these subframes may not be dynamically allocated.

According to another illustrative embodiment, DL or UL data allocation for certain flexible subframes within a group of subframes that comprise a repeating frame structure in a TDD radio communications system over an air interface between a UE and an eNB may be made in fixed subframes only. The dynamic allocations of certain flexible subframes will be made in a manner that is backwards compliant with UEs that do not support dynamic allocation by changing allocations in a manner that does not conflict with automatic retransmission requests.

According to another illustrative embodiment, an apparatus is provided for receiving DL and UL allocations for future subframes from an eNB in a TDD communications system using an air interface. Certain subframes within a repeating frame structure may be allocated as either DL or UL subframes according to a protocol within other subframes of the repeating frame structure.

According to another illustrative embodiment, an apparatus for transmitting and receiving data packets using a TDD air interface to communicate with UE devices transmits a dynamic allocation of certain UL and DL subframes to a UE in a particular subframe of a repeating frame structure.

According to another illustrative embodiment, a method for dynamically allocating subframes for DL and UL data transmission in a TDD communications system having a repeating frame structure of fixed and flexible subframes comprises optionally determining whether UL or DL data traffic is predominant, allocating flexible subframes to be DL or UL subframes responsive to the determining step, communicating the allocation of future subframes to a UE in a DL subframe, and continuing to dynamically allocate DL and UL subframes responsive to the data traffic to be communicated to the UE.

According to another illustrative method, a method for providing dynamic subframe allocation in a TDD communications system comprises determining for a selected UE whether the UE can support the dynamic allocation of subframes, and if the UE can support it, allocating subframes according to a dynamic subframe allocation in a repeating frame configuration to better match the data traffic being communicated to and from the UE.

According to another illustrative embodiment, a method for dynamically allocating subframes in a TDD communications system is provided as a set of executable instructions on a computer readable medium which, when executed by a programmable communications device using an air interface, provide a dynamic allocation of subframes based on a certain protocol. Subframes within the repeating frame carrying certain channel information are designated as protected subframes and may not be changed from the original TDD configuration, while subframes within the radio frame that are not carrying certain channel information are designated as flexible subframes. Flexible subframes may be allocated as either DL or UL subframes, according to certain rules. In this manner, the amount of data capacity for UL or DL traffic may be increased dynamically according to the data traffic being transmitted.

According to another illustrative embodiment, an apparatus capable of dynamically allocating subframes in a TDD communications system over an air interface for communicating to one or more UE devices determines, via air interface communications or through network communications, whether eNB and UE communications in adjacent cells will experience interference due to the use of dynamic allocation of TDD subframes, and responsive to the determining step, transmits a dynamic allocation of certain UL and DL subframes to a UE in a particular subframe of a repeating frame structure. Following a transmitted message to the UE in a DL subframe, a response will be received from the UE in a following UL subframe according to a certain protocol. If the UE responds indicating the message was not correctly received, the eNB will retransmit the message in a subsequent DL subframe.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in claims that may be presented.

BRIEF DESCRIPTION OF THE DRAWINGS

For a more complete understanding of the invention, and the advantages thereof, reference is now made to the following descriptions taken in conjunction with the accompanying drawing, in which:

FIG. 5 depicts the TDD frame configurations available in e-UTRAN for TDD radio frames;

FIG. 7 illustrates an example of a TDD radio frame in configuration 1 including the channel signals and the subframes they are associated with;

DETAILED DESCRIPTION

The illustrative embodiments described are directed to an application in an E-UTRAN system with TDD. However, the embodiments are not limited to this example application and the use of the embodiments in other communications systems to provide implicit rules for determining and configuring the dynamic allocation of packet based subframes and dynamically changing the scheduling of resources is envisioned as part of the present invention and are within the scope of any claims presented.

Figure 1:
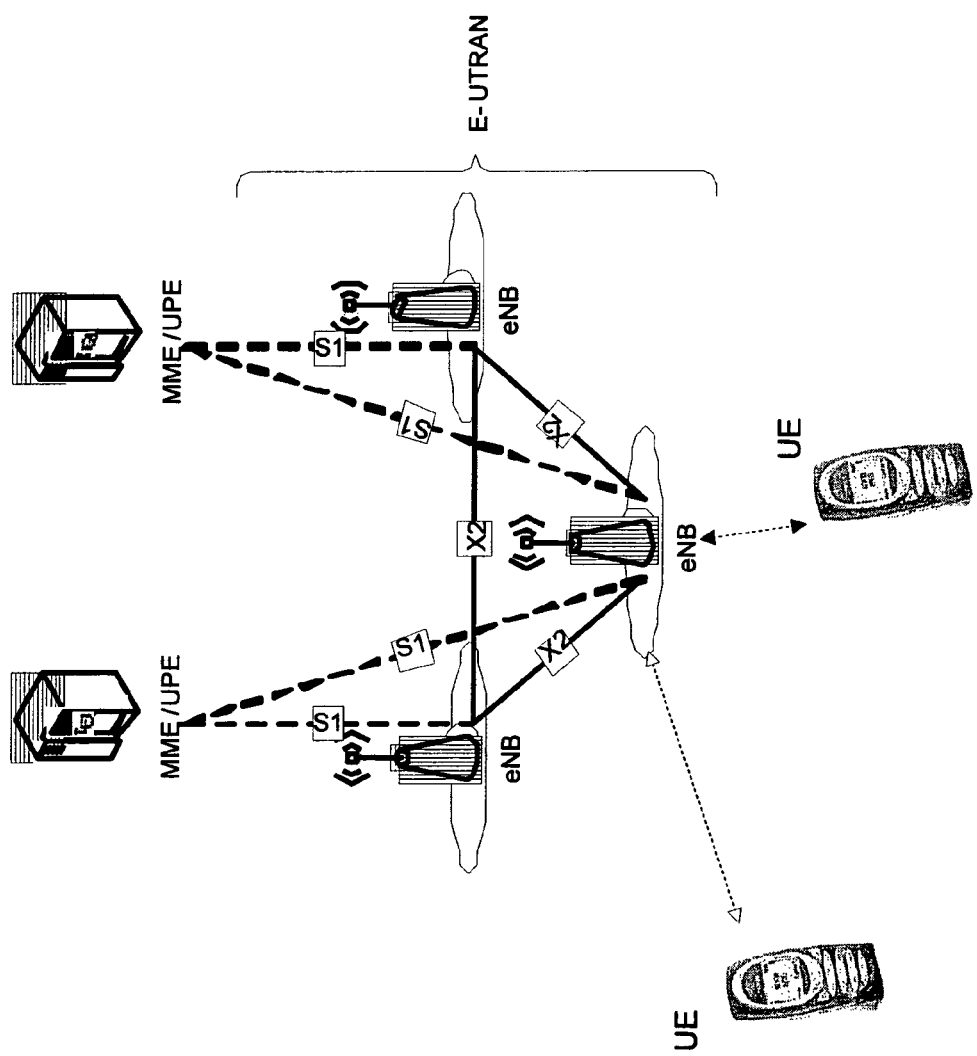
FIG. 1 illustrates a system level diagram of a radio frequency interface communication system including a wireless communication system.

Referring initially to FIG. 1, illustrated is a system level diagram of a radio frequency interface communication system including a wireless communication system that provides an environment for the application of the principles of the present invention. The wireless communication system may be configured to provide features included in the evolved UMTS terrestrial radio access network ("e-UTRAN") universal mobile telecommunications services. Mobile management entities ("MMEs") and user plane entities ("UPEs") provide control functionality for one or more e-UTRAN node B (designated "eNB," an "evolved node B," also commonly referred to as a "base station") via an S1 interface or communication link. The base stations communicate via an X2 interface or communication link. The various communication links are typically fiber, microwave, or other high-frequency metallic communication paths such as coaxial links, or combinations thereof.

The base stations communicate over an air interface with user equipment (designated "UE"), which is typically a mobile transceiver carried by a user. Alternatively, the user equipment may be a mobile web browser, text messaging appliance, a laptop with a mobile PC modem, or other user device configured for cellular or mobile services. Thus, communication links (designated "Uu" communication links) coupling the base stations to the user equipment are air links employing a wireless communication signal. For example, the devices may communicate using a known signaling approach such as a 1.8 GHz orthogonal frequency division multiplex ("OFDM") signal. Other radio frequency signals may be used.

The eNBs may host functions such as radio resource management (e.g., internet protocol ("IP"), header compression and encryption of user data streams, ciphering of user data streams, radio bearer control, radio admission control, connection mobility control, dynamic allocation of resources to user equipment in both the uplink and the downlink), selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The MME/UPEs may host functions such as distribution of paging messages to the base stations, security control, terminating U-plane packets for paging reasons, switching of U-plane for support of the user equipment mobility, idle state mobility control, and system architecture evolution bearer control. The UEs receive an allocation of a group of information blocks labeled physical resource blocks ("PRBs") from the eNBs.

Figure 2:
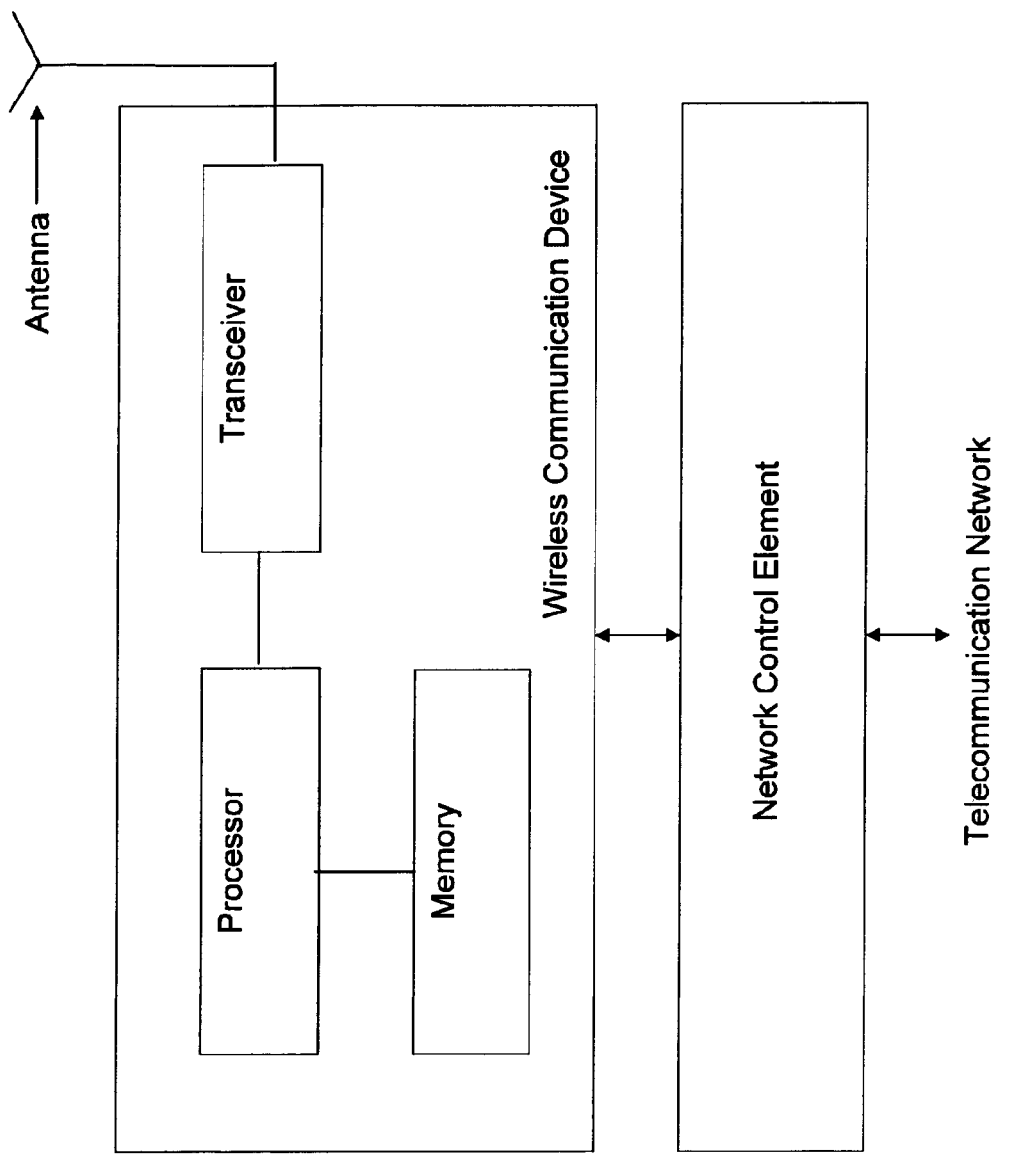
FIG. 2 illustrates a simplified system level diagram of an example communication element of a communication system.

FIG. 2 illustrates a simplified system level diagram of an example communication element of a communication system that provides an environment and structure for application of the principles of the present invention. The communication element may represent, without limitation, an apparatus including an eNB, UE such as a terminal or mobile station, a network control element, or the like. The communication element includes, at least, a processor, memory that stores programs and data of a temporary or more permanent nature, an antenna, and a radio frequency transceiver coupled to the antenna and the processor for bidirectional wireless communication. Other functions may also be provided. The communication element may provide point-to-point and/or point-to-multipoint communication services.

The communication element, such as an eNB in a cellular network, may be coupled to a communication network element, such as a network control element of a public switched telecommunication network ("PSTN"). The network control element may, in turn, be formed with a processor, memory, and other electronic elements (not shown). Access to the PSTN may be provided using fiber optic, coaxial, twisted pair, microwave communication, or similar communication links coupled to an appropriate link-terminating element. A communication element formed as a UE is generally a self-contained device intended to be carried by an end user and communicating over an air interface to other elements in the network.

The processor in the communication element, which may be implemented with one or a plurality of processing devices, performs functions associated with its operation including, without limitation, encoding and decoding of individual bits forming a communication message, formatting of information, and overall control of the communication element, including processes related to management of resources. Exemplary functions related to management of resources include, without limitation, hardware installation, traffic management, performance data analysis, tracking of end users and mobile stations, configuration management, end user administration, management of the mobile station, management of tariffs, subscriptions, and billing, and the like. The execution of all or portions of particular functions or processes related to management of resources may be performed in equipment separate from and/or coupled to the communication element, with the results of such functions or processes communicated for execution to the communication element. The processor of the communication element may be of any type suitable to the local application environment, and may include one or more of general-purpose computers, special-purpose computers, microprocessors, digital signal processors ("DSPs"), and processors based on a multi-core processor architecture, as non-limiting examples.

The transceiver of the communication element modulates information onto a carrier waveform for transmission by the communication element via the antenna to another communication element. The transceiver demodulates information received via the antenna for further processing by other communication elements.

The memory of the communication element, as introduced above, may be of any type suitable to the local application environment, and may be implemented using any suitable volatile or nonvolatile data storage technology, such as a semiconductor-based memory device, a magnetic memory device and system, an optical memory device and system, fixed memory, and removable memory. The programs stored in the memory may include program instructions that, when executed by an associated processor, enable the communication element to perform tasks as described herein. Exemplary embodiments of the system, subsystems, and modules as described herein may be implemented, at least in part, by computer software executable by processors of, for instance, the mobile station and the base station, or by hardware, or by combinations thereof. Other programming may be used such as firmware and/or state machines. As will become more apparent, systems, subsystems and modules may be embodied in the communication element as illustrated and described above.

Figure 3:
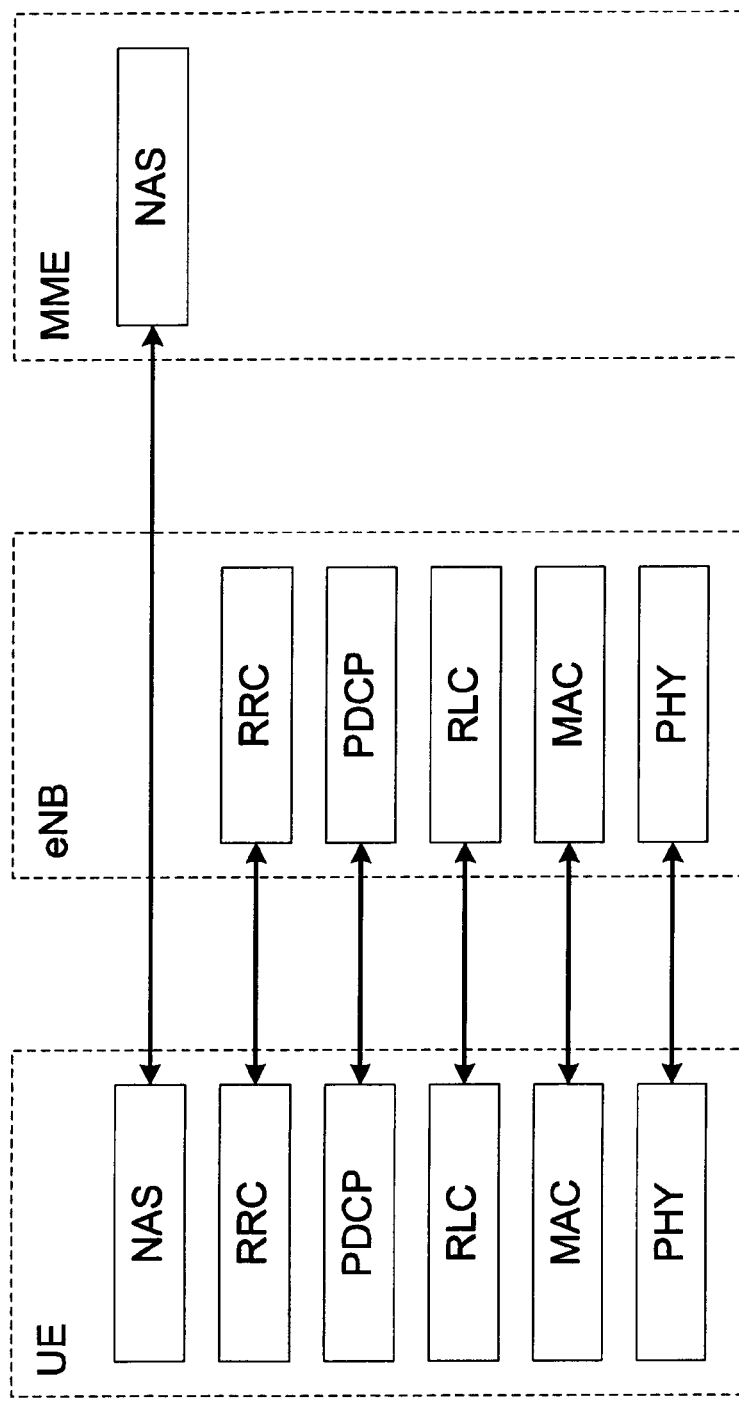
FIG. 3 illustrates a block diagram of an embodiment of a wireless communication device and a network element.

FIG. 3 depicts a block diagram of an embodiment of a UE and an eNB constructed according to the principles of the present invention and coupled to an MME. The UE and the eNB each include a variety of layers and subsystems: the physical layer ("PHY") subsystem, a medium access control layer ("MAC") subsystem, a radio link control layer ("RLC") subsystem, a packet data convergence protocol layer ("PDCP") subsystem, and a radio resource control layer ("RRC") subsystem. Additionally, the user equipment and the mobile management entity ("MME") include a non-access stratum ("NAS") subsystem.

The physical layer subsystem supports the physical transport of packets over the LTE air interface and provides, as non-limiting examples, cyclic redundancy check ("CRC") insertion (e.g., a 24 bit CRC is a baseline for physical downlink shared channel ("PDSCH"), channel coding (e.g., turbo coding based on QPP inner interleaving with trellis termination), physical layer hybrid-automatic repeat or retransmit request ("HARQ") processing, and channel interleaving. The physical layer subsystem also performs scrambling such as transport-channel specific scrambling on a downlink-shared channel ("DL-SCH"), broadcast channel ("BCH") and paging channel ("PCH"), as well as common multicast channel ("MCH") scrambling for all cells involved in a specific multimedia broadcast multicast service single frequency network ("MBSFN") transmission. The physical layer subsystem also performs signal modulation such as quadrature phase shift keying ("QPSK"), 16 quadrature amplitude modulation ("QAM") and 64 QAM, layer mapping and pre-coding, and mapping to assigned resources and antenna ports. The media access layer or MAC performs the HARQ functionality and other important functions between the logical transport layer, or Level 2, and the physical transport layer, or Level 1.

Each layer is implemented in the system and may be implemented in a variety of ways. A layer such as the PHY in the UE may be implemented using hardware, software, programmable hardware, firmware, or a combination of these as is known in the art. Programmable devices such as DSPs, RISC, CISC, microprocessors, microcontrollers, and the like may be used to perform the functions of a layer. Reusable design cores or macros as are provided by vendors as ASIC library functions, for example, may be created to provide some or all of the functions and these may be qualified with various semiconductor foundry providers to make design of new UEs, or e-Node B implementations, faster and easier to perform in the design and commercial production of new devices.

The e-UTRAN system architecture has several significant features that impact timing in the system. A transmission time interval ("TTI") is defined and users (e.g., UE or mobile transceivers) are scheduled on a shared channel every TTI. The majority of UE or mobile transceivers considered in the implementation of the e-UTRAN are full duplex devices. These UEs can therefore receive control and data allocations and packets from the e-NODE B or base station they are connected to in any subframe interval in which they are active. The UE detects when resources are allocated to it in the allocation messages on the physical downlink control channel (PDCCH). When downlink resources are allocated to a UE, the UE can determine that data or other packets are going to be transmitted towards it in the present frame or in coming frames. Also, the UE may have uplink resources allocated to it. In this case, the UE will be expected to transmit towards the e-Node B in coming frames on the uplink based on the allocated UL resources.

Additional timing related services are present in the environment. The e-UTRAN communications system provides automatic retransmission request (ARQ) and hybrid automatic retransmission request (HARQ) support. The HARQ is supported by the UE and this support has two different approaches. In the downlink direction, asynchronous HARQ is supported. However, the uplink or UL channel is a different standard channel that uses single carrier FDMA (SC-FDMA) and as currently provided, requires a synchronous HARQ. However, in any approach i.e. synchronous or asynchronous, after a packet is transmitted to the UE or eNB, an ACK/NACK (acknowledged/not acknowledged) response shall be transmitted by the UE or eNB towards the eNB or UE in a predefined time period later. In case NACK was received, eNB will retransmit the packet in the DL direction using same HARQ channel in any subframe after a predetermined delay from receiving NACK, which is recognized as asynchronous HARQ; while UE will retransmit the packet in the UL direction using same HARQ channel in a predefined subframe, which is recognized as synchronized HARQ. This synchronous HARQ specification which is currently part of the 3GPP UE specifications puts a timing constraint on the subframe resource allocations. As the LTE specifications are presently configured, the UE has to be able to make an UL transmission at certain points in time.

The e-UTRAN specifications support air interface signaling using both frequency division duplex (FDD), where uplink (signaling from the UE to the eNB) and downlink (signaling from the eNB towards the UE) can occur at the same time but are spaced apart at different frequencies; and time division duplex (TDD), where the UL and DL frames are communicated on the same carrier but spaced apart in time. Of particular interest to the embodiments of the present invention are the frame structures of TDD radio frames. The frame structures have been selected so that TDD and FDD services may be supported in the same environment and dual-mode devices may be easily implemented. The selection of the FDD or TDD services may depend on the type of data, whether the data transmission is asymmetric (for example, internet browsing tends to be very heavy on the downlink, while voice may be more or less symmetric on both downlink and uplink) the environment, and other parameters, there are advantages and disadvantages to each that are known to those skilled in the art.

The technical specifications (TS) document entitled "3GPP TS 36.300" version 8.5.0 (2008-05) available from the website www.3gpp.org provides in part the specifications for the physical interfaces for the E-UTRAN networks.

Figure 4:
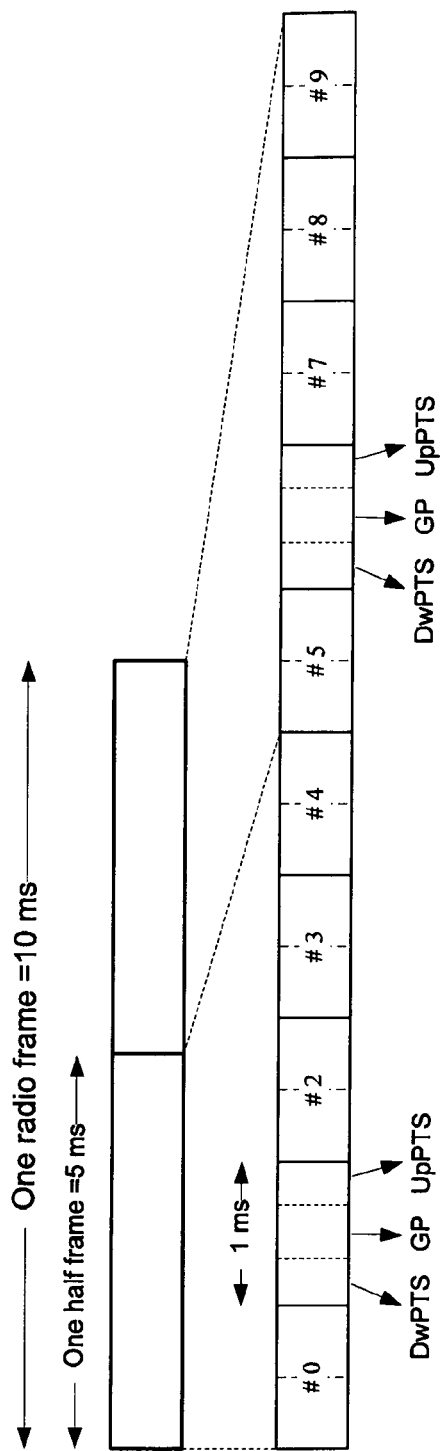
FIG. 4 illustrates the type 2 transport radio frame used in the e-UTRAN system to physically communicate packets to and from, for example, an e-Node B device using TDD.

FIG. 4 depicts, in very simple form, the type 2 frame structure used in the e-UTRAN system to physically communicate packets to and from, for example, an e-Node B device and one or more UE devices over the air interface using TDD. TS 36.300 v8.5.0 describes the TDD frame structure in more detail at pages 19-20. A radio frame in the system is presently defined as having a length of 10 milliseconds. The radio frame is further subdivided into 10 subframes, each having a length of 1 millisecond. Each subframe is further divided again into two slots; each slot has a length of 0.5 milliseconds as shown.

The TDD frame further has three special fields that may be varied in length to form a 1 millisecond special subframe. These special fields are the downlink pilot time slot (DwPTS), the guard period (GP) and the uplink pilot time slot (UpPTS). The TDD frame is the same length (10 milliseconds, which is 2 half-frames, or 10 subframes, each having two slots) as the FDD frame structure, making dual mode equipment easier to implement.

The E-UTRAN TDD frame is further designed to have both 5 millisecond and 10 millisecond switch point periodicity. There are seven configurations defined for the TDD that determine which arrangement of downlink and uplink patterns are to be used. FIG. 5 presents the TDD configuration patterns, which would be chosen by the radio resource controller RRC and communicated to the UE by the eNB, so the configuration pattern selected is known to both the UE and the eNB. Typically, the configuration believed to be chosen for most applications is #1, and that will be used as a non-limiting example for the discussion that follows. However, the configuration may be chosen to be any of the 7 defined in the specification. Further, the amount of downlink and uplink traffic subframes may be determined in part by the TDD configuration #0-6 that is selected.

TDD signaling may be chosen for a particular portion of the e-UTRAN system to take advantage of several beneficial aspects of TDD. The UE implementation for TDD devices may be kept fairly simple, for example, which lowers the cost of the devices. High peak data rates are provided in a limited frequency spectrum (since all transmissions are in a shared spectrum, unlike FDD). Reciprocity for fast and lean link adaptation and advanced antenna methods are available. Finally, the ability to achieve a significant gain in trunking efficiency (e.g. the gain of ensuring highest possible utilization of the available bandwidth so that less total bandwidth is needed to fulfill service requirements in a given system) comes from the ability to dynamically adjust uplink and downlink resources to match the traffic needs in the cell. The LTE specification offers the TDD operator to allocate up to 80%-90% of the system resources for downlink traffic.

However in the current releases of the LTE standard, fast or dynamic TDD adaptation is not available. For example, in the present systems, the UL/DL ratio may be theoretically changed every 80 milliseconds. But, inter-cell interference issues must be addressed and to ensure robust operation, the system capacity loss if switching the UL/DL ratio on a fast basis will be very high. Hence, so far, the implementations have been based on a working assumption that the changes in the UL/DL switching points need to be coordinated across the entire network. This means changes would be made infrequently, maybe on a daily, monthly, or even yearly basis.

An objective performance criterion for interference in these systems is signal interference and noise ratio (SINR). The present system approach to keeping SNR high is to coordinate UL and DL transmissions throughout different cells. This is accomplished by ensuring that all cells transmit in downlink at the same time and vice versa. This is particularly significant in "near far" situations where a UE far from the eNB that it is transmitting to may be closer to another UE or another eNB. If the two cells are not coordinated, UL and DL traffic transmitted at the same time and in the same frequency spectrum will interfere. Another problem is interference with RACH requests. If a new UE enters a cell and the UL/DL pattern is not coordinated, it may not be able to enter the system via a Random Access Channel transmission (RACH), which is an uplink message. Downlink traffic that is not coordinated with the RACH requests could cause the cell to be unavailable to new UEs or mobile UEs entering the area. The RACH signal would simply be "drowned" by the high power downlink signals.

Figure 6:
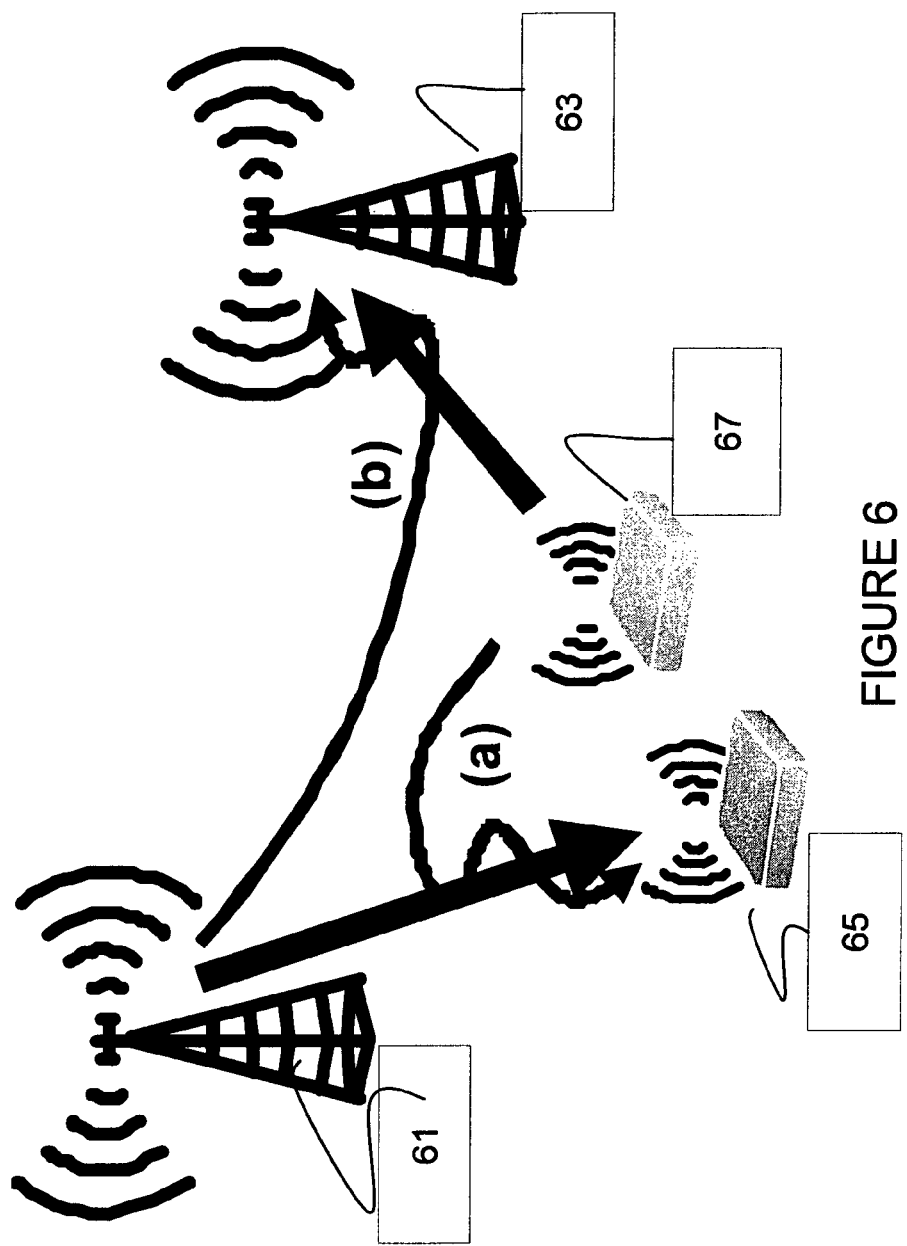
FIG. 6 illustrates an example of interference signals in adjacent cells using TDD radio communications.

FIG. 6 illustrates two examples of message interference that must be considered. In FIG. 6, eNB 61 is transmitting a DL message to UE 65. UE 65 is physically closer to UE 67 than to the eNB 61. At the same time, UE 67 is transmitting a UL message toward eNB 63. Two types of interference may occur in this example. Interference labeled (a) is the UL message from 67 interfering with the reception of the downlink message from eNB 61 to UE 65. Interference (b) illustrates the eNB 61 downlink message interfering with the uplink message from 67 to eNB 63. The signal strength of the eNB transmissions are presumed to be much greater than the UE transmissions, so even though the distance from 61 to 63 exceeds that of 67 to 63, the eNB downlink message has a stronger signal than the UE uplink message.

FIG. 6 illustrates what could happen, in terms of interference, if cell specific dynamic TDD allocation were performed without consideration of the SINR or other problems that may result. In addition to these interference problems, uncoordinated DL traffic from a high signal strength eNB can interfere with weaker uplink RACH access signaling that is directed from a UE to an eNB in a neighbor cell, effectively preventing new devices from accessing the cells.

The UL in LTE uses synchronous HARQ. When a packet is not received, a downlink (DL) message indicates retransmission is required. There are some problems identified for most UL/DL configurations in TDD because the synchronous HARQ round trip time (RTT) is 10 ms. Thus, particular care must be taken with respect to changes in TDD subframe timing, so the retransmit of the UL message can be performed.

Figure 7:
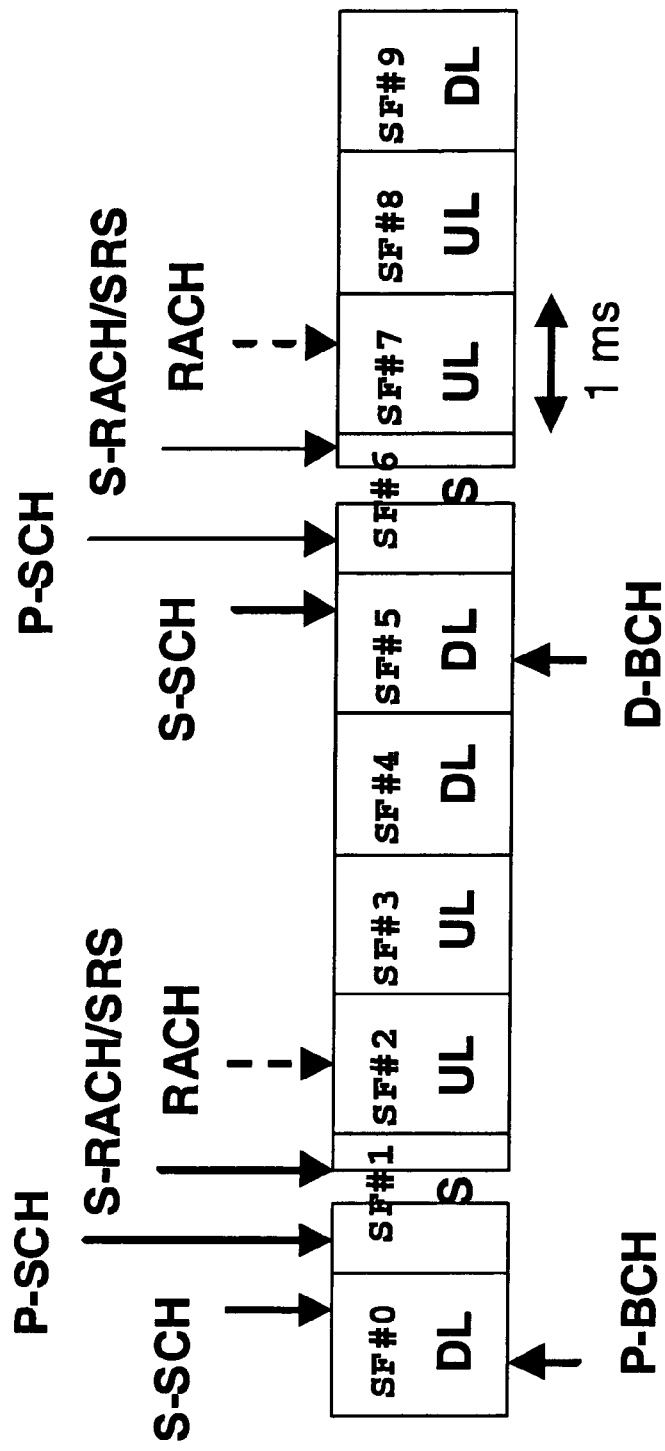

Embodiments of the present invention are now described. These embodiments provide methods and apparatus for enabling dynamic allocation of certain UL and DL subframes in a TDD system. In order to perform this dynamic allocation, certain parameters are protected. It is known that in the currently defined TDD configurations, certain subframes include control messages that are particularly sensitive to interference if DL and UL transmissions are not coordinated. For example, FIG. 7 depicts the ten subframes of a Configuration #1 TDD frame and certain message types that are transmitted in each subframe or portion of a subframe. Subframe #0, for example, is in Configuration 1, a DL subframe and carries the messages primary broadcast channel (P-BCH) and secondary synchronization channel (S-SCH). Subframe #1 in FIG. 7 is the special switching subframe and is divided into three portions, the first portion (the DwPTS) carries the primary synchronization channel (P-SCH), and the last portion (the UpPTS) carries two channels, the short-RACH channel (S-RACH) and the sounding reference symbol (SRS). The uplink subframe SF#2 carries the RACH channel.

In FIG. 7, the subframes #3 and 4, and 8 and 9, do not carry any particular critical channels for reliable system control information. The embodiments of the invention therefore approach the dynamic allocation of subframe resources by focusing on these subframes as "flexible" subframes. The subframes #0, 1, 2 and 5, 6, 7 are protected so that the critical control channel information is not subjected to extra interference by the use of the dynamic allocation. Importantly, by keeping these critical channels in their relative positions, the existing UEs that do not support a dynamic scheduling for the flexible subframes can still operate reliably with a system using the invention.

Figure 8:
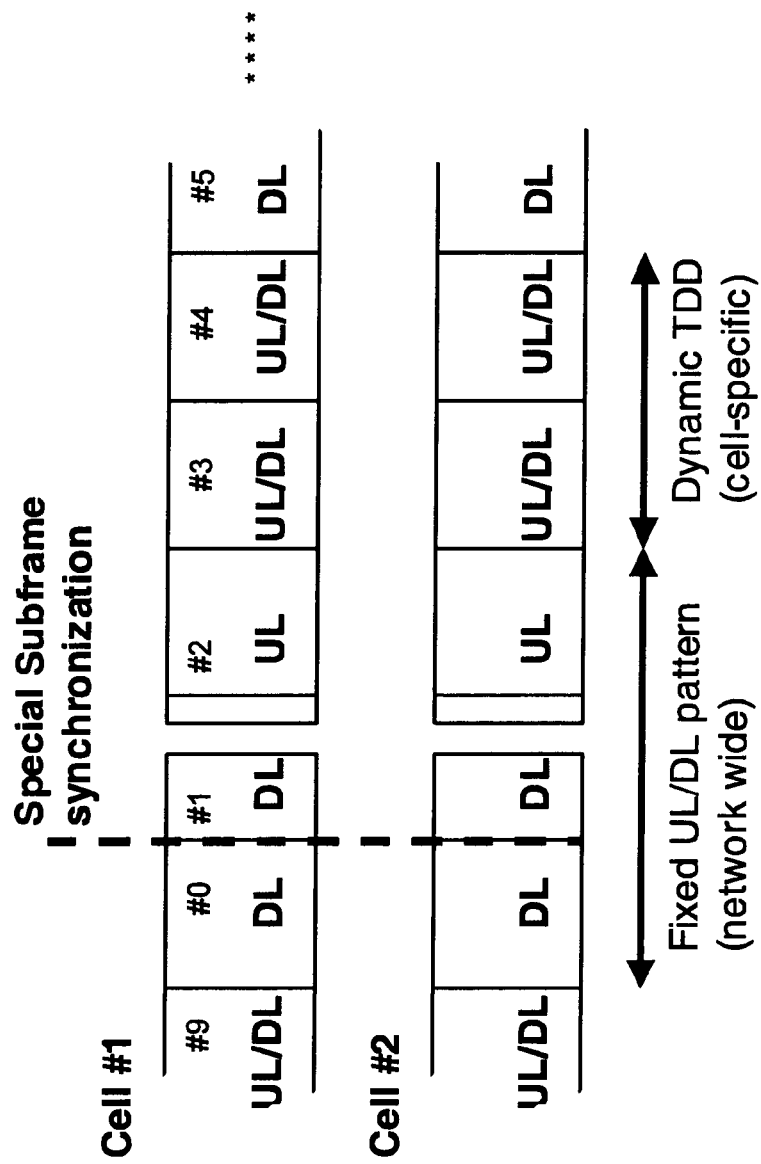
FIG. 8 illustrates TDD radio frames including dynamic allocation of certain subframes in an exemplary embodiment of the present invention.

FIG. 8 depicts the subframes for an exemplary embodiment of the invention applied to a TDD frame that is a modified version of Configuration 1. For a Release 8 UE, this TDD frame is exactly the same as the previous approach in many respects; in allocating the flexible subframes, the eNB will avoid allocations that have implications on when a UE can be scheduled in the downlink and uplink direction. In other words, the eNB will allocate the flexible subframes in such a manner that the TDD frame is backwards compliant for earlier UE configurations. In FIG. 8, the subframe traffic between two cells is assumed to have some over the air or other synchronization. This is necessary to protect the control channels, RACH, and synchronization channels as described above. Subframes #0, 1, and 2 remain as before as shown in FIG. 7 that is a downlink frame, the special switching frame, and an uplink frame. Subframes #3 and 4 are cell specific flexible subframes. These may be allocated as UL or DL in embodiments of the preferred invention as further described below. Subframes #5, 6 and 7 are again protected subframes and remain allocated as before, while subframes #8 and #9 are now designated flexible subframes that may be allocated in a dynamic manner.

As can be seen in FIG. 8, by using the embodiments of the invention to enable flexible subframe allocation, the methods enable two flexible subframes for each 5 millisecond period (in this example, TDD Configuration #1). Thus, the UL can be dynamically switched from about 20% to about 60% of the available bandwidth. Note that if subframe #4 is a UL subframe, then subframe #3 must also be an UL subframe as only one switch point is allowed in a 5 millisecond period. Further, if subframe #3 is a DL subframe, then subframe #4 is also a DL subframe.

There are two fundamental approaches to the scheduling of the dynamic subframe allocation in the preferred embodiments. In one approach, scheduling grants are embedded in the flexible subframes when these are downlink subframes. The UE will then perform "blind decoding" of the subframes. In another approach, a new UL/DL allocation grant method is used; however, in this approach, the grants are not sent in the flexible subframes. In this second approach, the grants are made in the protected subframes; for one non-limiting example, the grants for the flexible subframes 3 and 4 are placed in subframes 0 and 1, and the grants for flexible subframes #8 and 9 are scheduled in subframes #5 and 6. We may also consider a hybrid option where, e.g., the DL scheduling grants are embedded in flexible subframes but where the UL scheduling grants are not. The latter may be an attractive solution, considering that there is a large legacy processing delay from when a UL scheduling grant is transmitted until a UE is ready to transmit in uplink.

An important consideration in enabling the use of flexible subframes is to insure the proper HARQ sequences are still available. The particular control channels of interest are the physical downlink control channel (PDCCH), the physical uplink control channel (PUCCH) and the physical HARQ indication channel (PHICH). In order to enable the use of flexible subframes, some changes to the implementations of these control channels and the corresponding specifications are required.

Table 1 presents three options for the HARQ control:

TABLE 1

|  | Control in flexible SF | Control in fixed SF |
| --- | --- | --- |
| Option 1 | DL grant | UL grant, PHICH, PUCCH |
| Option 2 |  | DL grant, UL grant, PHICH, and PUCCH. |
| Option 3 | DL grant, UL grant, PHICH and PUCCH. |  |

Thus, for Option 1, the DL subframe grant (PDCCH message) is transmitted in the flexible subframe when it is dynamically chosen as a DL subframe. The UL subframe grant, PHICH and PUCCH are transmitted in the protected or fixed subframes of the example embodiment. In Option 2, the grants are always made in the fixed or protected subframes. In Option 3, the approach considers placing UL grants in the flexible subframes. From a backwards compatibility view, in a system with a Release 8 or earlier UE, which does not support dynamic allocations, the options are limited, since the HARQ processes have to be set up so they do not conflict with a flexible subframe. If the UL grants were very reliable (thus, HARQs were infrequent) then it might be possible to use Option 3 with these earlier designed devices as well. If the system can secure the performance of the uplink control channels also in the flexible subframe, then it may use this subframe (when dynamically selected as uplink subframe) also for carrying ACK/NACK. Hence, in those cases where the eNB or base station for a while will follow the default Release 8.0 pattern, all UEs connected to the same base station would be able to utilize the full system resources, just as would be the case for the fixed UL/DL configuration option. So the flexible subframes would have to schedule data so that the uplink traffic is in a subframe that the Release 8.0 UE considers to be an uplink subframe due to the legacy TDD configuration pattern. In this case, the eNB also needs to be committed to have an uplink in a flexible subframe later, to match the timing for the synchronous HARQ process (and for any acknowledgement required in downlink, e.g., respect the required PHICH timing for Release 8.0 UE).

In investigating the various options of Table 1 to enable the dynamic allocation of TDD subframes, from an implementation cost point of view, Option 1 is probably the most preferred embodiment. In Option 1, the UL grants which are placed in the fixed subframes would need to be extended to cover additional UL scheduling (e.g., the case when base stations allocate flexible subframes to uplink traffic). Further, PHICH timing rules need to be created for all cases of uplink allocations in the flexible subframes. The design needs to be transparent to Release 8.0 users which do not need the additional flexibility.

Option 2 is also of interest. In order to implement this approach, the following rules or parameters would need to be specified in the LTE standards:

All UL/DL grants, for the flexible subframes e.g. #3, 4 and #8, 9 in the example configuration will be scheduled in DL subframes that are fixed subframes, e.g. #0, 1 and #5, 6.

ACK/NACK physical resources required to acknowledge UL traffic sent in flexible subframes #3, 4 or #8, 9 are to be sent in fixed DL subframes #0, 1 and #5, 6 in this example.

ACK/NACK physical resources required to acknowledge DL traffic sent in flexible subframes #3-4, #8-9 are sent in fixed UL subframes #2 and #7.

Asynchronous HARQ is enabled in uplink to optimize TDD flexibility,

Thus, to implement the TDD adaptation requires several changes to the system specifications and operations of the UE and the eNB.

The design tradeoff in enabling the dynamic TDD subframe allocation as provided in the exemplary method embodiments of the invention is seen when the round trip time (RTT) for a retransmission cycle is investigated. That is, when a message is responded to with a NACK, the sender automatically begins looking for the next available subframe to retransmit the message. Currently, the 3GPP specifications assume that a received message has a minimum processing time that limits how soon the retransmit can be scheduled. For example, presently, the eNB is allocated a minimum 3 ms processing time; similarly the UE has a 3 ms minimum processing time. In later implementations, it is hoped that these minimum processing times could be assumed.

Figure 9:
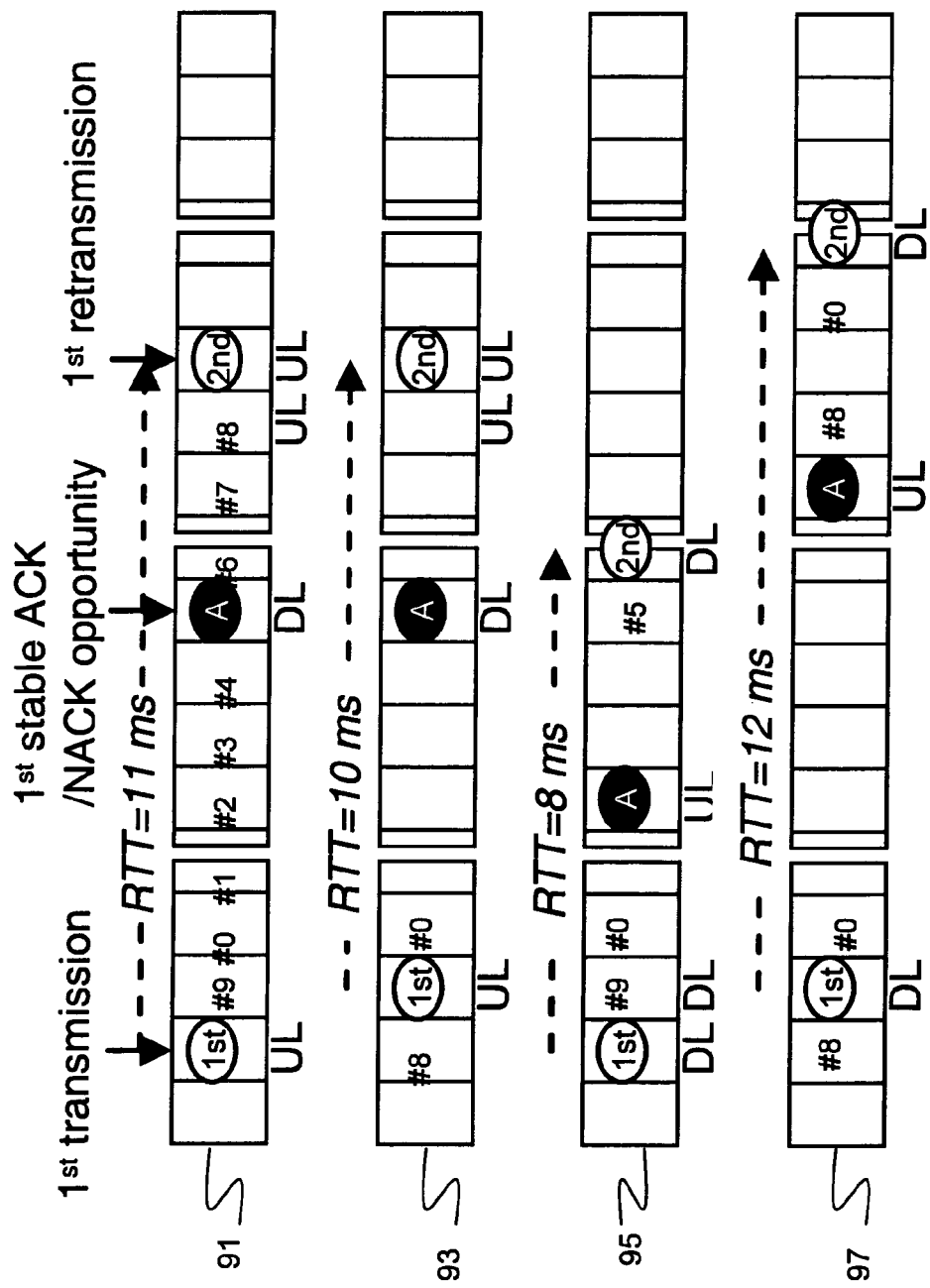
FIG. 9 illustrates the operation of HARQ sequences for four example retransmission requests in TDD subframes using the methods of the present invention.

FIG. 9 illustrates the impact of the use of the flexible TDD subframe allocation on the RTT cycle time for several cases where the flexible subframes are UL or DL subframes. The RTT time is measured from the first transmission to the first retransmission that can occur.

In FIG. 9, four timing diagrams for TDD subframes in the system, using the flexible subframes and with a TDD configuration of the invention that has protected subframes and switch points similar to the present LTE TDD configuration #1 are shown. In each timing diagram, the frame is shown as divided into ten 1 millisecond subframes numbered from subframe #0-#9, a pattern that continuously repeats. For this example, TDD configuration pattern, there is a special switching subframe in subframes #1 and #6.

The first timing diagram 91 depicts an example where a flexible subframe in position #8 is used for an uplink transmission (UE to eNB or mobile to base station). The next fixed frame the eNB can use to send an acknowledge (labeled A in the figure) is subframe #5. Note that subframe #1 is a DL subframe, but is not 3 milliseconds or more after the UL message and so does not meet the processing time requirement, In this example, the acknowledge downlink message A indicates a retransmission is requested. In subframe number 5, the next fixed DL subframe, the ACK/NACK is sent. Now the UE needs to wait at least 3 milliseconds and then look for the next available UL subframe to retransmit the message. In this example, that is subframe #9. The RTT time elapsed then is 11 milliseconds.

In FIG. 9, the second timing diagram 93 varies the example above by one subframe that is an uplink message first transmitted in subframe #9. Again, the first available fixed DL subframe after the 3 milliseconds time is in subframe #5. The retransmission can occur more than 3 milliseconds later which is again subframe #9. So in this example, the acknowledge ACK DL message and the retransmission message in the UL are positioned in the same subframes as in the example in timing diagram 91, but because the first transmission subframe was one position later in time, the RTT time is reduced to 10 milliseconds.

In FIG. 9, two examples of downlink messages and uplink HARQ with retransmissions are also illustrated. Timing diagram 95 illustrates a DL message in subframe #8. The UE sends an ACK requesting retransmission in the next available UL subframe #2, which meets the 3 millisecond processing time rule. The retransmissions occur in subframe #6, the next available DL subframe. So in this example, the RTT time is 8 milliseconds.

Finally, in timing diagram 97 an example is illustrated where the first transmission of the DL subframe is #9. In subframe #7, the UE responds with an acknowledge ACK/NACK message in an UL subframe. Note in this example subframe #2 is not available because it does not meet the 3 millisecond processing time rule. Finally the retransmit occurs in the next subframe #1, which is a DL subframe more than 3 milliseconds after the retransmit request ACK UL message from the UE.

In using the dynamic allocation methods of the present invention, the UL/DL traffic allocation can be adjusted in as little as 5 or 10 milliseconds, so long as the UEs in the environment include support for these features. In a system including Release 8.0 UEs, the eNB must take care that any remaining synchronous HARQ processes can be completed before changing the subframe allocation. In systems where the UEs are modified to support the flexible subframe allocation, the full advantages of TDD can be achieved, in contrast to the TDD subframe allocations of the prior art systems, where changes to the allocations are practically only available infrequently and on a system wide basis.

In determining whether to enable the flexible dynamic TDD allocation of the embodiments, the eNB should preferably consider the presence of other cells and also, the number of Release 8 UEs in the system. In a situation where there are many Release 8 UEs, which have a fixed or synchronous HARQ scheduling, the use of the flexible subframes may be ineffective in increasing the efficient use of system resources. Also, in some cases where earlier version UEs are present in adjacent cells, the use of the flexible subframes may produce a decrease in SINR in the adjacent cells due to the use of uncoordinated subframe allocations.

The use of the preferred embodiments of the invention has been simulated and in simulation of a PDCCH downlink example, the use of dynamic TDD subframe allocation has been shown to provide significant gains in system performance. When a number of Release 8 UEs are in use in the cell and/or adjacent cells, use of the embodiments of the invention may not be as desirable as it would be for cells with newly designed UEs.

Note that the implementation of any of the embodiments above may be performed in software, hardware, firmware, and may be provided as a set of instructions that are retrieved from storage and executed by a programmable processor or other programmable device that is part of a UE or eNB implementation including without limitation core processors such as RISC, ARM, CPU, DSP and microcontroller cores, standalone integrated circuit devices. Method may be implemented as a state machine with associated logic circuitry, a FPGA or CPLD, ASIC, semi-custom IC or the like may be used. The storage may be non-volatile memory, such as FLASH or programmed memory, such as PROM, ROM, EPROM and the like. The storage may be a CD or DVD program storage medium containing the executable instructions for performing the embodiments. In one embodiment, executable instructions are provided on a computer readable medium that when executed, perform the methods of determining the dynamic subframe allocation for the flexible subframes in a TDD communications system.

The illustrative embodiments described above are directed to an LTE 3GPP communications system with TDD. However, the embodiments are not limited to this example application and the use of the embodiments in other communications systems to provide rules for dynamic allocation of subframes in a time division duplexed communication system is envisioned as part of the present invention and within the scope of any claims presented.

The invention claimed is:

1. A method, comprising:
receiving, at a user equipment over an air interface in one or more fixed downlink subframes from a node, a subframe allocation for a time division duplex frame comprising at least one fixed subframe and a plurality of flexible subframes, the subframe allocation identifying a plurality of flexible subframes and indicating an assignment for each of the plurality of flexible subframes as an uplink subframe or a downlink subframe, the assignment based on an indication received at the node indicating whether the user equipment supports dynamic allocation of subframes; and forming, by the user equipment, a subframe pattern that includes at least one fixed uplink subframe, at least one fixed downlink subframe, and a plurality of flexible subframes, each flexible subframe allocated as an uplink subframe or a downlink subframe based on the received subframe allocation.

2. The method of claim 1, wherein the receiving the subframe allocation further comprises:
assigning each of the plurality of flexible subframes to be the uplink subframe or the downlink subframe using one or more implicit rules.

3. The method of claim 1, wherein the receiving the subframe allocation further comprises:
receiving the assignments for the plurality of flexible subframes in a first fixed downlink subframe, wherein the first fixed downlink subframe occurs earlier than the plurality of flexible subframes in the subframe pattern.

4. The method of claim 1, wherein the receiving the subframe allocation further comprises:
receiving allocations for one or more flexible uplink subframes in a first fixed downlink subframe, wherein the first fixed downlink subframe occurs earlier than the one or more flexible uplink subframes in the subframe pattern.

5. The method of claim 1, wherein the receiving the subframe allocation further comprises:
receiving in a first downlink subframe allocations for one or more flexible downlink subframes; and
decoding the received allocation.

6. The method of claim 1, wherein the receiving the subframe allocation further comprises:
receiving, in a first downlink subframe, the assignments for the plurality of flexible subframes; and
decoding the received allocation.

7. The method of claim 1, further comprising:
supporting hybrid automatic retransmission requests; and
selecting, for an allocated downlink subframe, an uplink subframe later in the subframe pattern for transmitting a retransmission request.

8. The method of claim 1 further comprising:
receiving, in a first-flexible subframe, a first dynamic allocation for one or more flexible uplink subframes;
receiving, in the first flexible subframe, a second dynamic allocation for one or more flexible downlink subframes; and
decoding the first and second allocations.

9. An apparatus comprising:
at least one processor; and
at least one memory including computer program code, the at least one processor, the at least one memory, and the computer program code configured to cause the apparatus to at least:
receiving, at an apparatus over an air interface in one or more fixed downlink subframes from a node, a subframe allocation for a time division duplex frame comprising at least one fixed subframe and a plurality of flexible subframes, the subframe allocation identifying a plurality of flexible subframes and indicating an assignment for each of the plurality of flexible subframes as an uplink subframe or a downlink subframe, the assignment based on an indication received at the node indicating whether the apparatus supports dynamic allocation of subframes; and
forming, by the apparatus, a subframe pattern that includes at least one fixed uplink subframe, at least one fixed downlink subframe, and a plurality of flexible subframes, each flexible subframe allocated as an uplink subframe or a downlink subframe based on the received subframe allocation.

10. The apparatus of claim 9 further configured to at least:
determine the one or more fixed uplink subframes and the one or more fixed downlink subframes and the plurality of flexible subframes within the subframe pattern based on an implicit rule.

11. The apparatus of claim 9 further configured to at least:
receive the assignments for the plurality of flexible subframes in a first fixed downlink subframe occurring earlier in the subframe pattern than the plurality of flexible subframes.

12. The apparatus of claim 9 further configured to at least:
receive allocations for one or more flexible uplink subframes in a first fixed downlink subframe occurring earlier in the subframe pattern than the plurality of flexible subframes.

13. The apparatus of claim 9 further configured to at least:
receive the subframe allocation within a first flexible downlink subframe; and
decode the received dynamic subframe allocation.

14. The apparatus of claim 9 further configured to at least:
select the plurality of flexible subframes as uplink subframes or downlink subframes or a combination of uplink and downlink subframes using one or more implicit rules.

15. An apparatus comprising:
at least one processor; and
at least one memory including computer program code, the at least one processor, the at least one memory, and the computer program code configured to cause the apparatus to at least:
identify capabilities of a user equipment, connected to an apparatus that is capable of communicating data using a time division duplex frame that has a plurality of dynamically allocated subframes;
determine an assignment for each of a plurality of flexible subframes within a time division duplex frame, the assignment based on the identified capabilities of the user equipment and indicating each of the plurality of flexible subframes as an uplink subframe or a downlink subframe; and
transmit the allocation to the user equipment over an air interface in one or more fixed downlink subframes, wherein the allocation provides packet communications between the apparatus and the user equipment.

16. The apparatus of claim 15, further configured to at least:
determine the flexible uplink and/or flexible downlink subframes within the time division duplex frame based on one or more implicit rules.

17. The apparatus of claim 15 further configured to at least:
transmit the allocation for the flexible uplink and/or flexible downlink subframes in a first fixed downlink subframe occurring earlier in a subframe pattern.

18. The apparatus of claim 15 further configured to at least:
transmit the allocation for one or more flexible uplink subframes in a first fixed downlink subframe occurring earlier in a subframe pattern.

19. The apparatus of claim 15 further configured to at least:
transmit the allocation for the one or more flexible downlink subframes in a first downlink subframe.

20. The method of claim 1, wherein each of the plurality of flexible subframes may be changed between the uplink subframe and the downlink subframe, and wherein each of the one or more fixed subframes is fixed as either another uplink subframe or another downlink subframe.

21. The method of claim 1, wherein at least one of the plurality of flexible subframes comprises two time slots.

22. The method of claim 1, wherein at least one of the one or more fixed uplink subframes or fixed downlink subframes comprises two time slots.

23. The method of claim 1, wherein the subframe allocation comprises one or more scheduling grants.

24. The method of claim 1, wherein each flexible subframe is contiguous in time with the corresponding adjacent subframe.

25. The apparatus of claim 9, wherein each flexible subframe is contiguous in time with the corresponding adjacent subframe.

26. The apparatus of claim 15, wherein each flexible subframe is contiguous in time with the corresponding adjacent subframe.

27. The method of claim 1, wherein, when the indication received at the node indicates that the user equipment supports dynamic allocation of subframes, the subframe allocation includes an assignment to dynamically allocate flexible uplink subframes or downlink subframes, and when the indication received at the node indicates that the user equipment does not support dynamic allocation of subframes, the subframe allocation includes an assignment of flexible subframes based on a subframe type supported by the user equipment.

* * * * *